United States Patent [19]

Weber

[11] Patent Number: 5,093,662

[45] Date of Patent: Mar. 3, 1992

[54] LOW ALTITUDE WIND SHEAR DETECTION WITH AIRPORT SURVEILLANCE RADARS

[75] Inventor: Mark Weber, Arlington, Mass.

[73] Assignee: Massachusetts Institute of Technology, Cambridge, Mass.

[21] Appl. No.: 472,534

[22] Filed: Jan. 30, 1990

[51] Int. Cl.[5] ............................................. G01S 13/95
[52] U.S. Cl. ..................................... 342/26; 342/460; 340/968
[58] Field of Search ................. 342/26, 108, 160, 460, 342/461; 340/968

[56] References Cited

U.S. PATENT DOCUMENTS

| Re. 33,152 | 1/1990 | Attas | 342/26 |
|---|---|---|---|
| 4,223,309 | 9/1980 | Payne | 342/26 |
| 4,649,388 | 3/1987 | Atlas | 342/26 |
| 4,712,108 | 12/1987 | Schwab | 342/26 |
| 4,811,020 | 3/1989 | Montheil | 342/159 |
| 4,835,536 | 5/1989 | Piesinger et al. | 342/26 |
| 4,843,597 | 6/1989 | Gjessing et al. | 367/15 |
| 4,940,987 | 7/1990 | Frederick | 342/26 |
| 4,965,573 | 10/1990 | Gallagher et al. | 340/968 |
| 4,996,533 | 2/1991 | May et al. | 342/108 |

OTHER PUBLICATIONS

Automated Detection of Microburst Windshear for Terminal Doppler Radar, Mark W. Merritt.
"Electrical Characteristics of Microburst-Producing Storms in Denver", *Volume of the 24th Conference on Radar Meteorology*, Mar. 27-31, 1989.
"A Preliminary Assessment of Thunderstorm Outflow Wind Measurement with Airport Surveillance Radars", May 15, 1987 Chapters I, IIIB, V, App. A-C.
"Low Altitude Wind Shear Detection with Airport Surveillance Radars: Evaluation of 1987 Field Measurements", Aug. 31, 1988, Chapters I, V and VII.
"Dual-Beam Autocorrelation Based Wind Estimates from Airport Surveillance Radar Signals", Jun. 21, 1989.

*Primary Examiner*—John B. Sotomayor
*Attorney, Agent, or Firm*—Robert M. Asher

[57] ABSTRACT

Method and apparatus for detecting low altitude wind shear through the use of autocorrelation on the received and processed echo signals. Self Autocorrelation of echo signals and autocorrelation of echo signals from consecutive pulses are used to calculate the low altitude Doppler velocities over distance. In an alternate embodiment, autocorrelation of echo signals from alternate pulses is also required. Wind shear is calculated from low altitude Doppler velocity as a function of location.

9 Claims, 2 Drawing Sheets

LOW ALTITUDE WIND SHEAR DETECTION WITH AIRPORT SURVEILLANCE RADARS

The Government has rights in this invention pursuant to contract No. F19628-85-C-0002 awarded by the Department of the Air Force.

BACKGROUND OF THE INVENTION

The present invention is directed to a method and apparatus for detecting hazardous thunderstorm outflows such as microbursts, using airport surveillance radars.

Low level wind shear resulting from microbursts, wind gust fronts, tornado vortices, mesocyclones or other thunderstorm phenomena, are particularly hazardous to aircraft during takeoff and landing. These hazardous weather disturbances may be detected by specially dedicated narrow beam Doppler weather radars. However, these specialized radar systems are extremely expensive and are not available at most airports. Therefore, it is an object of the present invention to use airport surveillance radar which is readily available at most airports in the detection of low level wind shear.

U.S. Pat. No. 4,649,388 (Atlas) discloses a method for using airport surveillance radar to detect hazardous weather disturbances. This method uses the high and low beam antenna receivers on the airport surveillance radars. Use of this dual-beam signal processing approach, however, raises several implementation issues. ASRs normally transmit circularly polarized (CP) signals during heavy rain in order to reduce precipitation clutter in the aircraft detection processor. In order to avoid a resulting 15 to 20 dB loss in received power from weather echos, any weather processor on an airport surveillance radar should receive its input from the opposite-sense polarized antenna port. ASR-8's and ASR-9's have only one path through the rotary joint of the radar for opposite-sense polarized signals; thus during operation with circular polarization, weather data from both high and low beams could not be accessed simultaneously. Power spectra for the two beams would have to be calculated on alternate antenna scans, requiring memory storage for all data from one of the scans. Assuming range coverage to 20 km and two byte integer representation of the in-phase and quadrature signals, this would require 3 Mbytes of dedicated physical memory.

Another issue is the computational requirement of estimating power spectra for the two beams in each resolution cell and calculating a velocity based on the difference of the two spectra. Assuming that the spectra were estimated using Fast Fourier Transforms (FFT), about 1000 floating point operations per resolution cell would be required. For the same 20 km range coverage considered previously, this translates to 17 million floating point operations per second. While both the memory storage and processing speed requirements could be met, they would certainly drive the cost of the signal processing computer higher.

It is an object of the present invention to provide a means for detecting hazardous weather disturbances with reduced computational and storage requirements while maintaining the high-confidence created from dual-beam signal processing of ASR information.

SUMMARY OF THE INVENTION

The present invention is directed to a dual-beam velocity estimation technique based on low order autocorrelation lags from the low and high beam received signals. Fundamental to the invention is the assumption that the signals received by an ASR can be modelled with a bimodal Gaussian power spectra.

The present invention employs an airport surveillance radar with its means for radiating a radar beam and antenna receivers for receiving a high and low beam. A conventional algorithm for filtering out ground clutter is employed on the echo signals received on the low and high beams. In accordance with the preferred embodiment, only the 0 and 1 sample delay autocorrelation lags for each beam are used to determine the low altitude velocity. The low altitude velocity is taken directly from the center frequency of one of the two components of the assumed bimodal Gaussian power spectra. The low altitude Doppler velocity is thus determined over a range of distances from which, wind shear can be calculated. An alarm may be provided for signalling a hazardous wind shear in excess of a predetermined threshold.

Since only the 0 and 1 sample delay autocorrelation lags are used for each beam, physical memory storage requirements and the computational requirements are both significantly reduced.

Other objects and advantages of the present invention will become apparent to those skilled in the art from the following description taken in conjunction with the drawings.

DETAILED DESCRIPTION OF THE PREFERRED EMBODIMENTS

Figure 1:
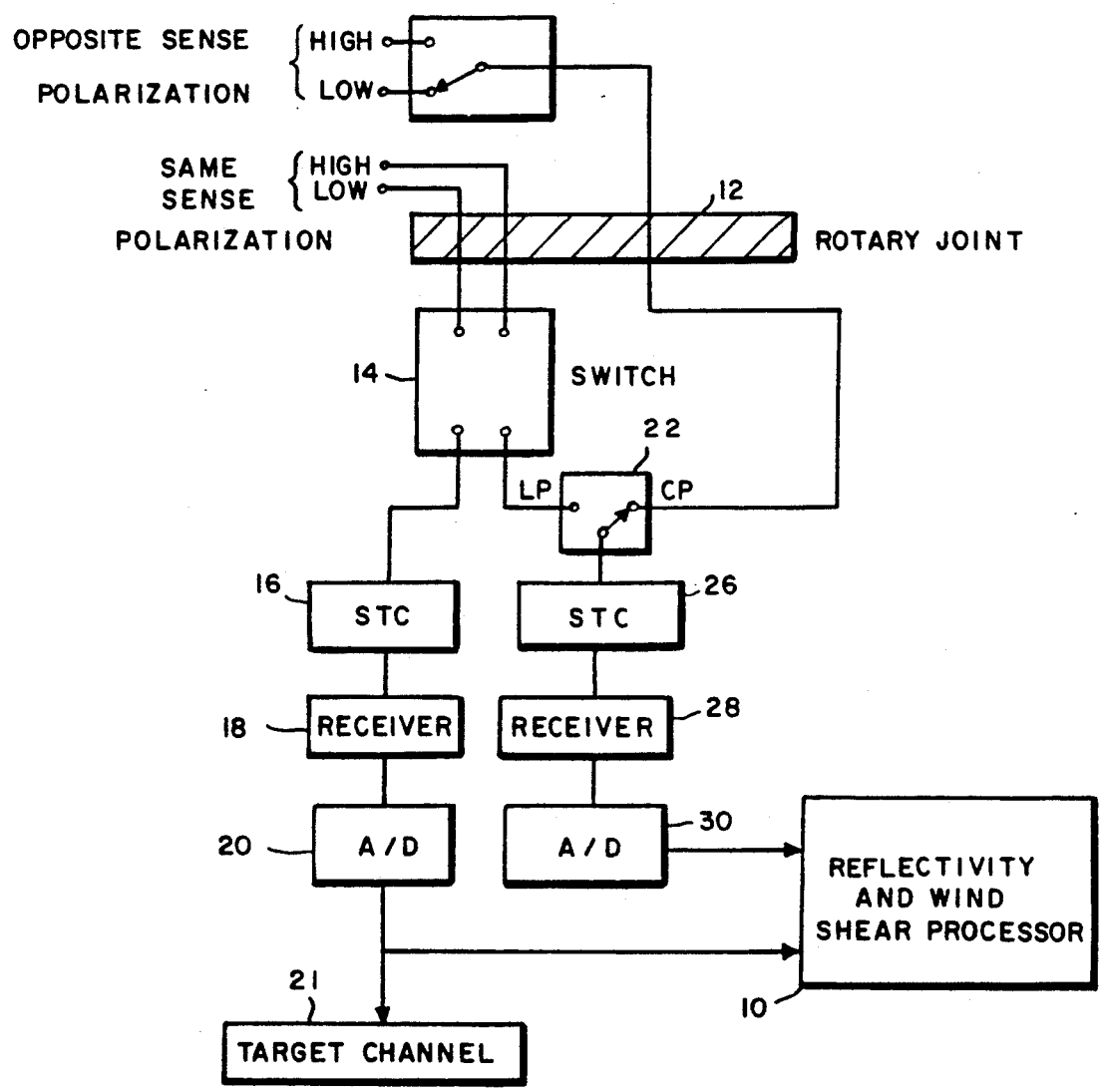
FIG. 1 is a schematic block diagram of the signal path for an airport surveillance radar modified to use the hazardous weather detection method of the present invention.

In order to perform the low altitude wind shear detection of the present invention, radar signals must be provided to an appropriately programmed computer. Referring to FIG. 1, a block diagram is provided demonstrating the signal paths for providing echo signal information to the reflectivity and wind shear processor 10 of the present invention. The diagram shows a signal path which would be used with a typical airport surveillance radar such as an ASR-8 or ASR-9. The airport surveillance radar has an antenna at its top which rotates above a rotary joint 12. The radar radiates a series of pulses along a radar beam, the pulses are emitted at a rate of approximately one every millisecond. In between the emission of consecutive pulses, the antenna listens for echo signals which are produced when the pulse is reflected from a scatterer such as an airplane, a rain drop, a tree or any other object in the path of the radar beam. These radar are generally used in the detection of aircraft. Since it is not desirable to confuse the echo signals from an airplane with those coming from raindrops, under rainy conditions, the airport surveillance radar employs circularly polarized pulse signals rather than linear polarization. It is known that the echo signals produced by raindrops are oppositely polarized to those produced by an airplane when circularly polarized signals are used. Thus, the responses can be distinguished.

The ASR-8 and ASR-9 radars are provided with two feed horns. One feed horn is used to transmit the radar beam and receive echo signals. The signals received along this antenna are referred to as the low beam. A second feed horn is positioned in vertical alignment with the low beam feed horn but produces a beam that is tilted up at an angle of approximately three degrees above the low beam. The echo signals received from this feed horn are referred to as the high beam. In general use for detecting an airplane, the high beam is used at close range and the low beam is used at long range. By using the high beam at close range, echo signals caused by ground clutter such as buildings, trees, etc. are reduced. In order to receive the high beam at close range and the low beam at long range, radar is provided with a range-azimuth gated (RAG) mode switch 14. The RAG mode switch connects the processing channels to the high beam echo signals in the very beginning of the echo period following the sending of a pulse and then changes to the low beam for the remainder of the echo period. The RAG mode switch is carefully controlled at each azimuth angle to make the switch from high beam to low beam and back at the appropriate time. The RAG mode switch is generally set to switch when the echo signal is that received from approximately 20 kilometers from the radar tower.

The signal path for the airport surveillance radars are shown in FIG. 1. The echo signals passed through the RAG mode switch 14 are provided to a sensitivity time control (STC)16. The sensitivity time control 16 prevents clipping of the echo signals by attenuating signals received at short range. The signals are then passed to a receiver 18 which includes a quadrature detector. The quadrature detector takes high frequency signals at around 3 GHz and reduces them by a factor of several thousand to a frequency of approximately one MHz. The signals are also separated into their in-phase and quadrature components. The in-phase and quadrature components are provided to the A to D converter 20 which converts them into digital form. The digitized echo signal components are then provided to the target channel 21 for detecting the location of aircraft. In accordance with the present invention, the signals are also provided to the reflectivity and wind shear processor 10.

The RAG mode switch 14, in order to practice the present invention, is a double pole double throw switch. The switch has two outputs, the first goes to the target channel 21, the second goes to the reflectivity and wind shear processor 10. In the first portion of the echo signal when the target channel is receiving the high beam, the reflectivity and wind shear processor receives the low beam through its terminal on the RAG mode switch 14. Over the second portion of the echo signal, the RAG mode switch causes the target channel to be connected to the low beam and the reflectivity and wind shear processor to be connected to the high beam. The present design is simplified by allowing the reflectivity and wind shear processor to share the information provided to the target channel. Thus, when the radar is sending linearly polarized radar signals, the reflectivity and wind shear processor will receive and process the echo signals from the high and low beams simultaneously. The radar controller which controls all of the equipment in the signal path indicates to the wind shear processor 10 when the RAG mode switch interchanges the low and high beams. While the STC 16 setting for the target channel might not be optimum for measurement of very low reflectivity weather signatures by the wind shear processor 10, it is unlikely that this would pose a problem for detection of "wet" microbursts, the most prevalent form of wind shear.

When the radar transmits circularly polarized signals, the weather channel receiver would be switched by switch 22 to receive echo signals along the single RF path from the orthogonal sense antenna ports. Due to the lack of a second RF signal path from the orthogonal sense antenna ports in the standard ASR radar antennas, it is not possible to simultaneously access the high and low beam signals. However, data can be gathered by switching between the high and low beams on alternate antenna scans. Switch 24 is provided to permit successive gathering of the high beam and low beam data. It is contemplated that for an entire 360° scan, data would be taken from one beam and in the next scan data would be taken from the other beam. Each scan takes approximately five seconds. Data from the first scan would need to be stored for use in conjunction with the second scan. The storage of data will be discussed in greater detail with respect to the reflectivity and wind shear processor 10. During the use of circularly polarized signals, the switch 22 is always switched to connect the wind shear channel with the orthogonal sense antenna ports. When linearly polarized signals are used, switch 22 connects the wind shear processor to signals from the same sense antenna ports. Just as in the target channel processors, the weather channel is provided with a sensitivity time control 26, a receiver 28 and an A to D converter 30. The sensitivity time control 26 can be programmed so as not to obscure low reflectivity wind shear events.

Figure 2:
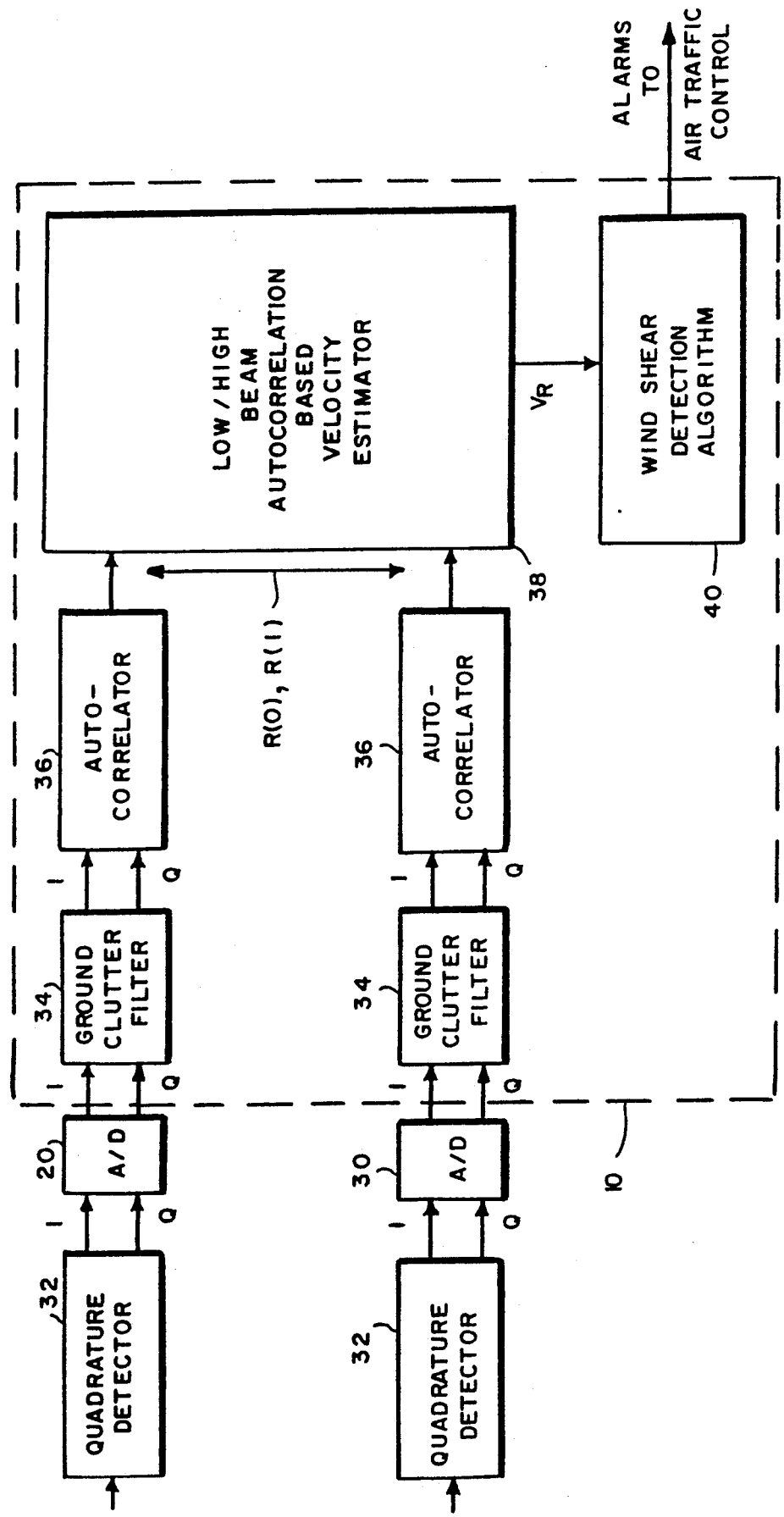
FIG. 2 is a block diagram of the signal processing in the hazardous weather detection method of the present invention.

The reflectivity and wind shear processor 10 of the present invention will now be described in greater detail with reference to FIG. 2. As described above, quadrature detectors 32 are located in the receiver 18 and receiver 28. Quadrature detectors separate out the in-phase and quadrature components of the received echo signals. These components are provided through the A to D converters and then the digitized components are provided to the reflectivity and wind shear processor. The digitized signals are filtered by a standard ground clutter filter 34. As is well known in the art, the ground clutter filter is a high pass filter which attenuates out signals from buildings and trees, etc. Since the ground clutter is not moving, the echo signals return with a low frequency.

The present invention is based on the assumption of a bimodal Gaussian power spectra for the signals received in an airport surveillance radar's low and high beams. Physically, the presence of two separated modes in the power spectra implies a radial velocity field that is strongly discontinuous within the radar's beamwidth, as at the top of a shallow microburst outflow. In a region where the radial wind speed varies linearly with height or is constant, the double Gaussian model can also adequately represent the power spectrum that would be measured by an ASR since the two components may overlap substantially, producing a broad, unimodal spectrum.

$$S_i(f) = \frac{a_{i,1}}{\sqrt{2\pi}\,\sigma_1} \exp\left[\frac{-(f-f_1)^2}{2\sigma_1^2}\right] +$$

$$\frac{a_{i,2}}{\sqrt{2\pi}\,\sigma_2} \exp\left[\frac{-(f-f_2)^2}{2\sigma_2^2}\right]$$

This equation defines double Gaussian curves for the high and low beams. In other words there are two bell curves. The first bell curve is centered around the frequency $f_1$ of the low altitude wind in a thunderstorm outflow. The Doppler velocity of the low altitude wind is directly determinable from the frequency, given the wavelength and the speed of light. The shape of the first bell curve in each beam is determined by two parameters, amplitude of the low or high beam component of the low altitude echo signal $a_{1,1}$ of or $a_{2,1}$ and the width of the low altitude bell curve $\sigma_1$. The second Gaussian curve is located around the frequency $f_2$ of the high altitude velocity. Its shape is determined by the amplitude of the high altitude component of the low or high beam $a_{1,2}$, or $a_{2,2}$ and the width of the high altitude bell curve $\sigma_2$.

In solving this model to determine the Doppler velocity $f_1$, the computation may be eased by use of the autocorrelation lags. In order to solve for the equation given above having eight parameters, the first three autocorrelation lags are required, $R(0)$, $R(1)$, $R(2)$. The solution for the low altitude Doppler velocity is derived and explained in project report ATC-167 entitled "Dual-Beam Autocorrelation Based Wind Estimates from Airport Surveillance Radar Signals" authored by the inventor, Mark E. Weber and published on June 21, 1989. This document is report number DOT/FAA/PS-89/5 and is available to the public through the National Technical Information Service, Springfield, Va. 22161. The contents of project report ATC-167 is hereby incorporated by reference herein. In particular, Appendix A of report ATC-167 describes the mathematics for determining the frequency $f_1$ which determines low altitude Doppler velocity.

Rather than relying on three autocorrelation lags to determine the low altitude Doppler velocity, the presently preferred embodiment provides for calculation of the Doppler velocity using only the self autocorrelation and the first autocorrelation lag. The first method for solving the equation described above requires at least 1½ times as many computer operations as would be needed by the preferred embodiment. The number of unknowns in the dual Gaussian equation can be reduced from 8 to 6 by assuming that the ratio of high and low beam amplitudes for each spectral component can be determined from a known beam weighting function. The assumption is that the two spectral components have intrinsic amplitudes $a_j$ that are modified by known beam weighting coefficients $w_{i,j}$. The weighting coefficients are determined as a function of the known high and low elevation beam patterns. In determining values for $w_{i,j}$ it is assumed that the intensity of rain is constant in the high and low altitudes thus providing for a constant reflectivity. Also, as described in Report ATC-167, an angle is assumed which corresponds to the approximate elevation angle of the top of a thunderstorm outflow. The presently preferred angle is about 2°. The mathematics for determining the weighting coefficients $w_{1,j}$ is explained in greater detail in Appendix B of report ATC-167 which has been incorporated by reference herein.

Thus, using the known weighting coefficients, the low altitude Doppler velocity can be determined from the self autocorrelation and first autocorrelation lag. The low altitude Doppler velocity $f_1$ is determined as the solution to the following equation, $$f_1 = \frac{1}{2\pi\tau} \tan^{-1}\left[R_1(\tau) - \frac{R_1(0)}{R_2(0)} \frac{\omega_{1,2}}{\omega_{2,2}} R_2(\tau)\right]$$

where $R(0)$ is the self-autocorrelation and $R(\tau)$ is the first autocorrelation lag.

In accordance with the presently preferred embodiment of the present invention, the self autocorrelation and first autocorrelation lags of the high and low beam were all calculated in the autocorrelators 36. The autocorrelations are performed over a series of echo signals in time so that an average autocorrelation can be arrived at. The presently preferred embodiment averages over 26 pulses. Autocorrelation is performed in each range gate of the received signal so as to provide the low altitude Doppler velocity as a function of distance.

Autocorrelation as performed by the autocorrelators 36 is a well known mathematical function. Self autocorrelation is performed by multiplying the echo signals by themselves and averaging them over an adequate number of echo signals in the received series of signals. The first autocorrelation lag is performed by pairing consecutive pulses with one another. Thus, the first echo signal is multiplied by the second echo signal and the second echo signal is multiplied by the third echo signal and so on. These paired echo signals are then averaged over a series of pulse pairs. In accordance with the embodiment described above in which the eight parameter equation is solved, the second autocorrelation lag is also required. Calculation of the second autocorrelation lag is performed by multiplying the first echo signal with the third echo signal, the second echo signal is multiplied by the fourth echo signal and the third echo signal is multiplied by the fifth echo signal and so on. Thus, the second autocorrelation lag is a function of alternate pulses from the series of echo signals.

When the radar is using linearly polarized radar signals, the low and high beams are received and processed simultaneously. However, when circularly polarized signals are being sent out an entire scan provides only the high or low beam echo signals. The autocorrelations must be stored in computer memory until the autocorrelations from the next scanned are obtained for the other beam. Advantageously, the amount of data which must be stored for each scan has been reduced by storing only the autocorrelation results.

The results of the autocorrelations are provided to the low/high beam autocorrelation based velocity estimator 38 which plugs the results into the equation for $f_1$ provided above. The results provide the low altitude velocity estimates as a function of distance from the tower and in each azimuth angle. Wind shear is identified by large differences in wind velocity over a short distance. A wind shear detection algorithm 40, such as that developed for the FAA's Terminal Doppler Weather Radar (Merritt reference ATC-127), may be used on the velocity estimates generated by the estimator 38 to identify any instances of hazardous wind shear. The basic wind shear algorithm takes a mathematical derivative of the low altitude Doppler velocity as a function of location. Any wind shear results that exceed a predetermined threshold may be used to generate an alarm. The alarm may be in the form of flashing or displaying the wind shear value on the radar screen in the air traffic control center.

In accordance with the present invention the computational requirements for determining the low altitude Doppler velocities has been significantly reduced. The wind shear detector of the present invention can be implement on 6 Mercury MC3200 array processing computers controlled by a Sun work station. This computer set up has a capacity of approximately 100 million floating point operations per second.

Embodiments of the present invention are intended to be merely exemplary and those skilled in the art should be able to make numerous variations and modifications to them without departing from the spirit of the present invention. Any such variations and modifications are intended to be within the scope of the present invention as defined in the appended claims.

I claim:

1. An airport surveillance radar method of detecting low altitude wind shear comprising the steps of:
   radiating a series of pulses along a radar beam;
   receiving a first series of echo signals from said beam at a first receiver;
   receiving a second series of echo signals from said beam at a second receiver vertically aligned with said first receiver;
   filtering out effects of ground clutter from each of said first and second series of echo signals;
   performing self autocorrelation on each of said filtered first and second series of echo signals;
   performing autocorrelation on consecutive pulses in each of said filtered first and second series of echo signals;
   determining low altitude Doppler velocity over a range of distances as a function of the self autocorrelation and the autocorrelation for consecutive pulses from each of said filtered first and second echo signals; and
   calculating wind shear as function of said low altitude Doppler velocity.

2. The radar method of claim 1 further comprising the step of generating an alarm if said wind shear exceeds a predetermined threshold.

3. The radar method of claim 1 further comprising the step of performing autocorrelation on alternate pulses in each of said filtered first and second series of echo signals and wherein the low altitude Doppler velocity is determined additionally as a function of the autocorrelation of alternate pulses.

4. An airport surveillance radar method of detecting low altitude wind shear comprising the steps of:
   radiating a series of pulses along a radar beam;
   receiving a first series of echo signals from said beam at a first feed horn;
   separating said first series of echo signals into a first series of quadrature and in-phase component signals;
   digitizing said first series of quadrature and in-phase component signals;
   filtering out effects of ground clutter from said digitized first series of quadrature and in-phase component signals;
   performing self autocorrelation on said filtered first series of component signals and averaging said self autocorrelations over a plurality of said signals;
   performing autocorrelation on consecutive signals in said filtered first series of component signals and averaging said autocorrelations over a plurality of said signals;
   storing said averaged self autocorrelations and said averaged autocorrelations of said first series of component signals;
   receiving a second series of echo signals from said beam at a second feed horn vertically aligned with said first feed horn;
   separating said second series of echo signals into a second series of quadrature and in-phase component signals;
   digitizing said second series of quadrature and in-phase component signals;
   filtering out effects of ground clutter from said digitized second series of quadrature and in-phase component signals;
   performing self autocorrelation on said filtered second series of component signals and averaging said self autocorrelations over a plurality of said signals;
   performing autocorrelation on consecutive signals in said filtered second series of component signals and averaging said autocorrelations over a plurality of said signals;
   determining low altitude Doppler velocity over a range of distances as a function of the stored average self autocorrelations and autocorrelations of said first series of component signals and the averaged self autocorrelations and autocorrelations of said second series of component signals; and
   calculating wind shear as a function of said low altitude Doppler velocity.

5. The radar method of claim 4 further comprising the step of generating an alarm if said wind shear exceeds a predetermined threshold.

6. Radar apparatus for detecting hazardous thunderstorm outflow comprising:
   means for radiating a radar beam having a series of pulses toward an area of surveillance and scanning said beam in azimuth;
   a first feed horn for receiving a first series of echo signals from said area of surveillance;
   a second feed horn vertically aligned with said first feed horn and aimed at about 3 degrees below said first feed horn for receiving a second series of echo signals;
   means for filtering out effects of ground clutter from echo signals received by said first and second feed horns;
   means for performing self autocorrelation and autocorrelation of consecutive signals in said first and second series of filtered echo signals;
   means for determining low altitude Doppler velocity over a range of distances as a function of the self autocorrelations and autocorrelations of consecutive signals on said first and second series of filtered echo signals; and
   means for calculating wind shear as a function of said low altitude Doppler velocity.

7. The radar apparatus of claim 6 further comprising an alarm which is activated in response to a calculated wind shear above a predetermined threshold.

8. The radar apparatus of claim 6 further comprising means for performing autocorrelation on alternate pulses.

9. The radar apparatus of claim 6 further comprising means for storing said self autocorrelations and autocorrelations from one of said first or second series of filtered echo signals.

* * * * *